United States Patent
Knepper et al.

(10) Patent No.: US 10,013,031 B2
(45) Date of Patent: Jul. 3, 2018

(54) SYSTEMS AND METHODS FOR MECHANICALLY INTERFACING CAMERA TO HINGE OF INFORMATION HANDLING SYSTEM

(71) Applicant: Dell Products L.P., Round Rock, TX (US)

(72) Inventors: Lawrence E. Knepper, Leander, TX (US); David M. Meyers, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/282,707

(22) Filed: Sep. 30, 2016

(65) Prior Publication Data
US 2018/0095504 A1    Apr. 5, 2018

(51) Int. Cl.
G06F 1/16       (2006.01)
E05D 11/00      (2006.01)
E05D 3/12       (2006.01)

(52) U.S. Cl.
CPC ............ *G06F 1/1686* (2013.01); *E05D 3/12* (2013.01); *E05D 11/00* (2013.01); *G06F 1/1618* (2013.01); *G06F 1/1681* (2013.01); *E05Y 2900/606* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,879,337 B2* | 4/2005 | Tatehana | ............... | H04N 5/2251 348/14.02 |
| 6,933,981 B1* | 8/2005 | Kishida | ............... | H04N 1/00249 348/207.1 |
| 7,154,744 B2* | 12/2006 | Sawai | ................. | H04M 1/0216 348/E7.079 |
| 7,373,187 B2* | 5/2008 | Park | ....................... | G06F 1/1616 455/566 |
| 7,418,280 B2* | 8/2008 | Lee | ....................... | H04M 1/0218 348/E5.025 |
| 7,483,723 B2* | 1/2009 | Soderlund | .............. | H04M 1/022 455/575.1 |
| 7,522,946 B2* | 4/2009 | Im | ....................... | H04M 1/0218 379/433.13 |
| 7,554,595 B2* | 6/2009 | Shin | ....................... | H04M 1/021 348/333.06 |
| 7,639,795 B2* | 12/2009 | Otani | ................... | H04M 1/0218 379/428.01 |
| 7,831,275 B2* | 11/2010 | Sato | ..................... | H04M 1/0218 348/14.02 |
| 7,864,524 B2* | 1/2011 | Ladouceur | ........... | G06F 1/1616 361/679.55 |
| 8,208,249 B2* | 6/2012 | Chin | ..................... | G06F 1/1618 361/679.27 |

(Continued)

Primary Examiner — Lisa Lea Edmonds
(74) Attorney, Agent, or Firm — Jackson Walker L.L.P.

(57) ABSTRACT

In accordance with embodiments of the present disclosure, a system may include a first member, a second member hingedly coupled to the first member via a hinge, and a camera mechanically interfaced with the hinge such that as the first member is rotated relative to the second member about the hinge, the camera rotates as a function of the rotation of the first member relative to the second member.

16 Claims, 7 Drawing Sheets

(56) References Cited

U.S. PATENT DOCUMENTS

| | | | | |
|---|---|---|---|---|
| 8,385,056 B2* | 2/2013 | Hayashi | ............... | H04M 1/0222 16/366 |
| 2003/0090865 A1* | 5/2003 | Silverstein | ............ | G06F 1/1626 361/679.56 |
| 2004/0198474 A1* | 10/2004 | Jung | .................... | H04M 1/0212 455/575.1 |
| 2005/0099533 A1* | 5/2005 | Matsuda | ............. | H04M 1/0218 348/375 |
| 2005/0134717 A1* | 6/2005 | Misawa | ............. | H04M 1/0218 348/333.06 |
| 2008/0112113 A1* | 5/2008 | Sawadski | ............ | H04M 1/0218 361/679.27 |
| 2009/0244832 A1* | 10/2009 | Behar | ..................... | G06F 1/162 361/679.55 |
| 2010/0053409 A1* | 3/2010 | Chang | .................. | G06F 1/1605 348/333.01 |
| 2011/0286166 A1* | 11/2011 | Nam | ..................... | G06F 1/1601 361/679.01 |

* cited by examiner

SYSTEMS AND METHODS FOR MECHANICALLY INTERFACING CAMERA TO HINGE OF INFORMATION HANDLING SYSTEM

TECHNICAL FIELD

The present disclosure relates in general to information handling systems, and more particularly to mechanically interfacing a camera to a hinge of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Because of their mobility, consumers of information handling systems increasingly use laptops. A laptop, often referred to a "notebook", may be a small, portable information handling system with a "clamshell" form factor including a keyboard assembly on a lower portion of the clamshell and a display assembly comprising a thin liquid crystal display screen or light-emitting diode display screen on an upper portion of the clamshell, with the keyboard assembly mechanically coupled to the display assembly via a mechanical hinge. Accordingly, the keyboard assembly and the display assembly may be rotated to an open position in order for a user to use the laptop. Conversely, a user may fold a laptop into its closed position for transportation, and thus may be suitable for mobile use.

In addition, information handling systems often include a small camera, sometimes referred to as a webcam. Such camera may feed or stream captured images in real time to or through an information handling system or to or through a network of information handling systems. A video stream or still images captured by the camera may be saved, viewed, or communicated to other networks via systems such as the Internet. In laptops, cameras are often integrated within the laptop form factor.

As laptop form factors evolve to increasingly narrow bezels and thinner display assemblies, cameras integrated into laptops have become smaller, lower resolution, and of shorter lens length. Further, in some existing or contemplated future form factors, a camera may not fit in its historical position in a bezel at a top of the display assembly. Existing solutions include placing a camera at the bottom of the display assembly (e.g., in order to avoid interference with display electronics) or placing the camera into the keyboard assembly, which may have more space for a higher-quality/higher-resolution camera. However, if the camera is placed in the keyboard assembly in a fixed position relative to the remainder of the keyboard assembly, the camera may not be at an optimal angle for the user's position. In addition, for laptops with 360-degree hinges allowing for the laptop to be placed in a "tablet mode" placement in the keyboard assembly means the camera will face away from the user when in such tablet mode.

SUMMARY

In accordance with the teachings of the present disclosure, the disadvantages and problems associated with location of cameras in information handling systems may be reduced or eliminated.

In accordance with embodiments of the present disclosure, a system may include a first member, a second member hingedly coupled to the first member via a hinge, and a camera mechanically interfaced with the hinge such that as the first member is rotated relative to the second member about the hinge, the camera rotates as a function of the rotation of the first member relative to the second member.

In accordance with these and other embodiments of the present disclosure, a method may include hingedly coupling a first member to a second member via a hinge and mechanically interfacing a camera with the hinge such that as the first member is rotated relative to the second member about the hinge, the camera rotates as a function of the rotation of the first member relative to the second member.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 8D, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1:
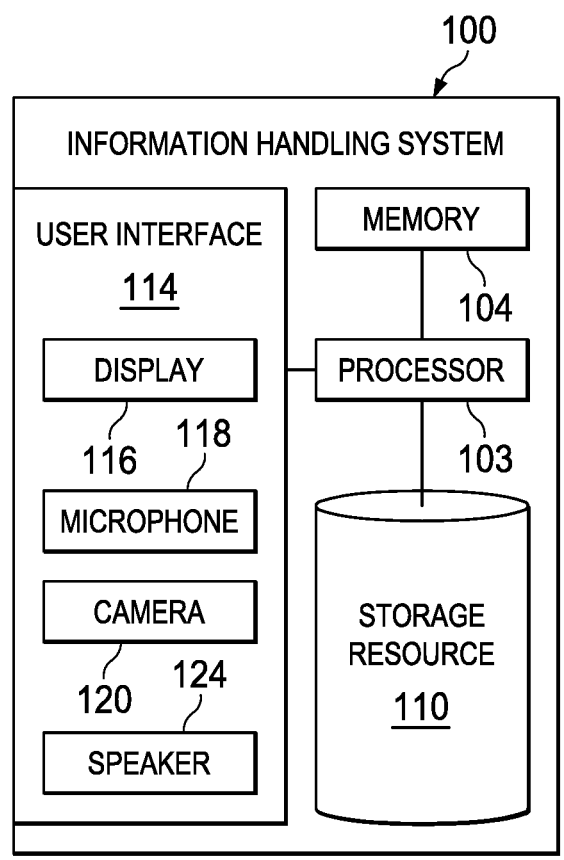
FIG. 1 illustrates a functional block diagram of selected components of an example information handling system, in accordance with embodiments of the present disclosure.

FIG. 1 illustrates a functional block diagram of selected components of an example information handling system 100, in accordance with embodiments of the present disclosure. In some embodiments, information handling system 100 may be a personal computer (e.g., a desktop computer or a portable computer). In other embodiments, information handling system 100 may comprise a mobile device (e.g., smart phone, a tablet computing device, a handheld computing device, a personal digital assistant, or any other device that may be readily transported on a person of a user of such mobile device).

As depicted in FIG. 1, information handling system 100 may include a processor 103, a memory 104 communicatively coupled to processor 103, a storage resource 110 communicatively coupled to processor 103, and a user interface 114 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 110, and/or another component of information handling system 100.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 100 is turned off.

Storage resource 110 may include a system, device, or apparatus configured to store data. Storage resource 110 may include one or more hard disk drives, magnetic tape libraries, optical disk drives, magneto-optical disk drives, solid state storage drives, compact disk drives, compact disk arrays, disk array controllers, and/or any other systems, apparatuses or devices configured to store data. In certain embodiments, storage resource 110 may include one or more storage enclosures configured to hold and/or power one or more of such devices. In the embodiments represented by FIG. 1, storage resource 110 may reside within information handling system 100. However, in other embodiments, storage resource 110 may reside external to information handling system 100 (e.g., may be coupled to information handling system 100 via a network).

User interface 114 may comprise any instrumentality or aggregation of instrumentalities by which a user may interact with information handling system 100. For example, user interface 114 may permit a user to input data and/or instructions into information handling system 100 (e.g., via a keypad, keyboard, touch screen, microphone, camera, and/or other data input device), and/or otherwise manipulate information handling system 100 and its associated components. User interface 114 may also permit information handling system 100 to communicate data to a user (e.g., via a display device, speaker, and/or other data output device). As shown in FIG. 1, user interface 114 may include one or more of a display 116, microphone 118, camera 120, and speaker 124.

Display 116 may comprise any suitable system, device, or apparatus configured to display human-perceptible graphical data and/or alphanumeric data to a user. For example, in some embodiments, display 116 may comprise a liquid crystal display.

Microphone 118 may comprise any system, device, or apparatus configured to convert sound incident at microphone 118 to an electrical signal that may be processed by processor 103. In some embodiments, microphone 118 may include a capacitive microphone (e.g., an electrostatic microphone, a condenser microphone, an electret microphone, a microelectromechanical systems (MEMs) microphone, etc.) wherein such sound is converted to an electrical signal using a diaphragm or membrane having an electrical capacitance that varies as based on sonic vibrations received at the diaphragm or membrane.

Camera 120 may comprise any system, device, or apparatus configured to record images (moving or still) into one or more electrical signals that may be processed by processor 103.

Speaker 124 may comprise any system, device, or apparatus configured to produce sound in response to electrical audio signal input.

In addition to processor 103, memory 104, storage resource 110, and user interface 114, information handling system 100 may include one or more other information handling resources. Such an information handling resource may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

Figure 2:
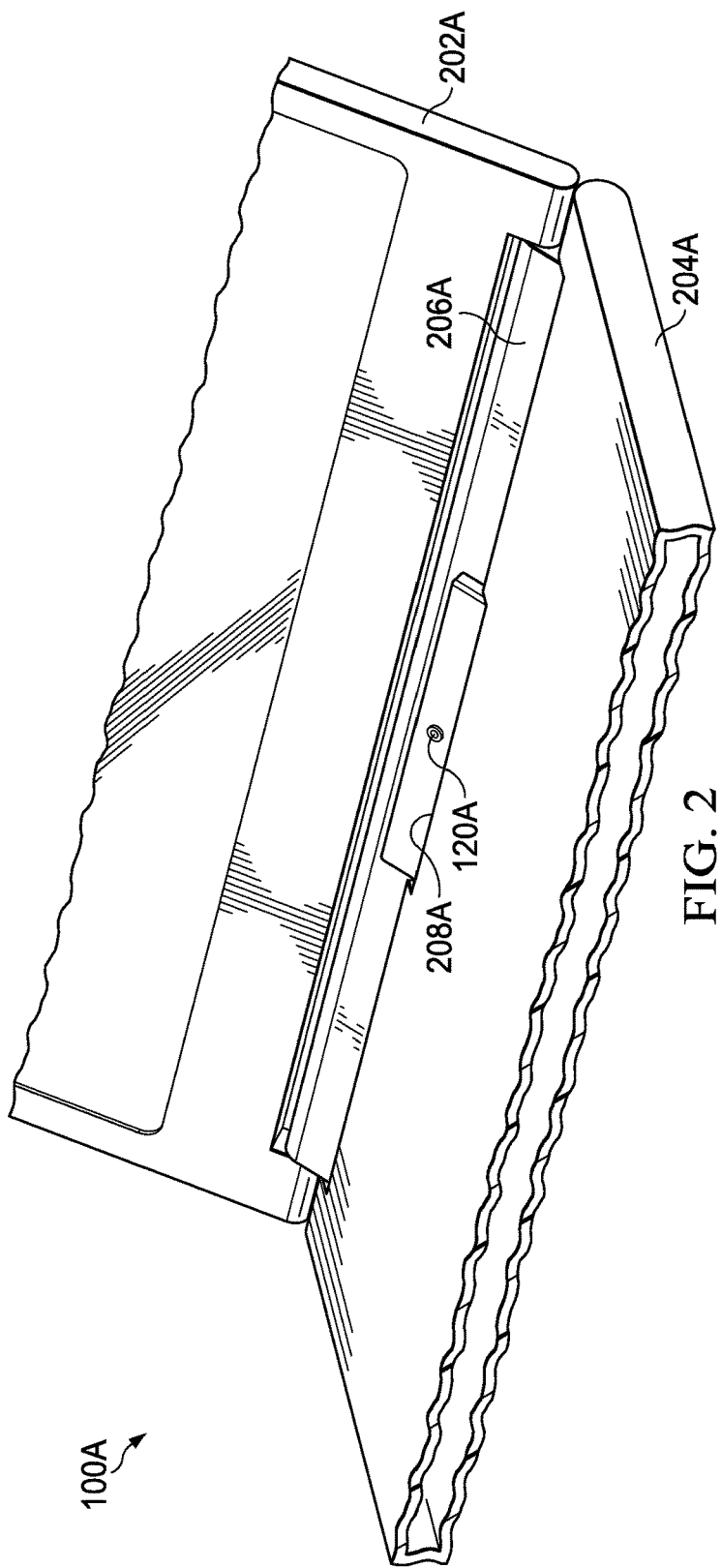
FIG. 2 illustrates an exterior perspective view of an example information handling system, in accordance with embodiments of the present disclosure.
Figure 3:
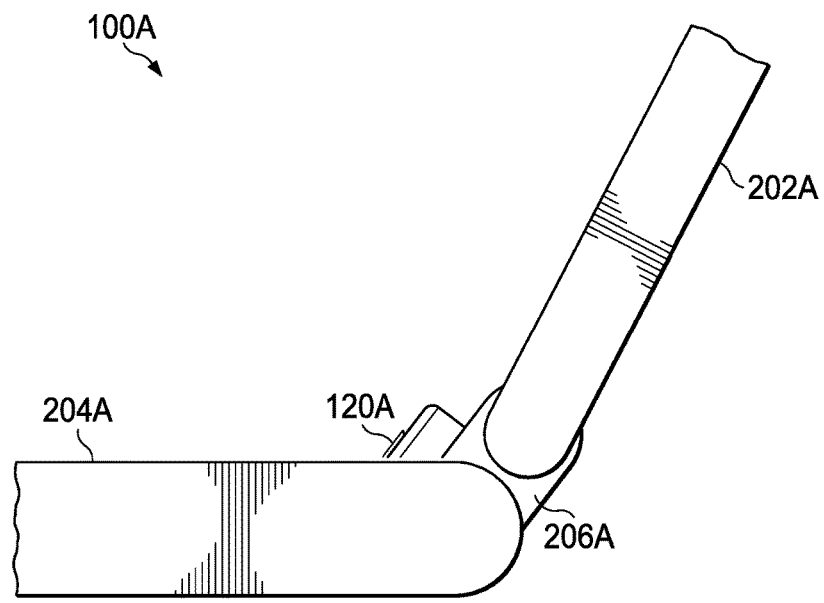
FIG. 3 illustrates an exterior side view of the example information handling system of FIG. 2, in accordance with embodiments of the present disclosure.
Figure 4:
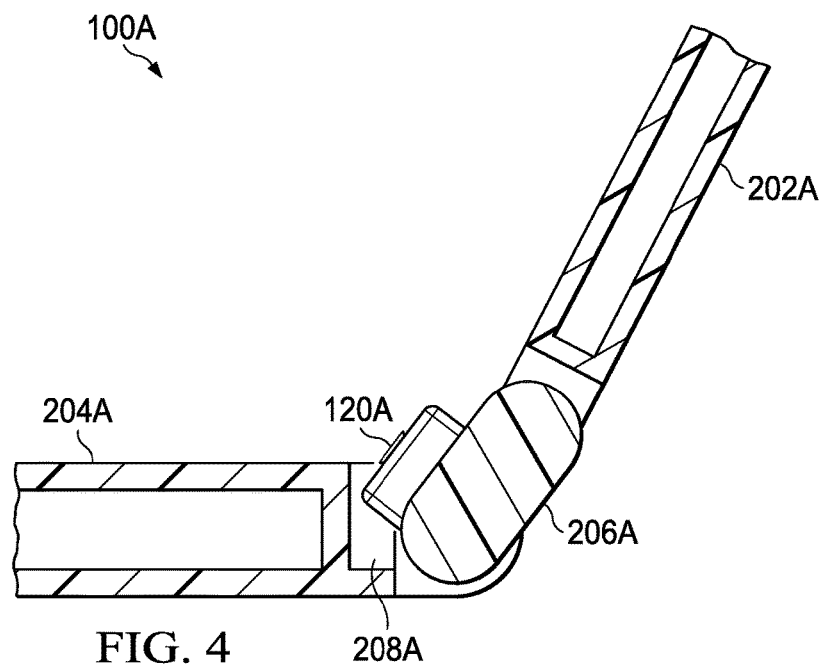
FIG. 4 illustrates an exterior side view of the example information handling system of FIGS. 2 and 3, with portions of the information handling system shown transparently to depict positioning of a camera mechanically interfaced with a hinge of the information handling system, in accordance with embodiments of the present disclosure.

FIGS. 2-4 illustrate various views of example information handling system 100A, in accordance with embodiments of the present disclosure. FIG. 2 illustrates an exterior perspective view of example information handling system 100A, FIG. 3 illustrates an exterior side view of example information handling system 100A, and FIG. 4 illustrates an exterior side view of example information handling system 100A, with portions of information handling system 100A shown transparently to depict positioning of a camera mechanically interfaced with a hinge 206A of information handling system 100A.

In some embodiments, information handling system 100A may be used to implement information handling system 100 depicted in FIG. 1. Although FIGS. 2-4 depict information handling system 100A as a laptop or notebook computer, some of the methods and systems disclosed, described, and claimed herein may not be limited to application to a laptop or notebook, but may also be applied to any mobile device sized and shaped to be readily transported and carried on a person of a user of an information handling system, a desktop computer, a tower computer, a server, etc.

As depicted in FIGS. 2-4, information handling system 100A may include a display assembly 202A and a keyboard assembly 204A hingedly coupled to display assembly 202A via a hinge 206A. Each of display assembly 202A and keyboard assembly 204A may be integral parts of a chassis or case for information handling system 100A. Each of display assembly 202A and keyboard assembly 204A may have an enclosure made from one or more suitable materials, including without limitation plastic, steel, and/or aluminum.

In operation, information handling system 100A may be translated between a closed position (e.g., a position of display assembly 202A relative to keyboard assembly 204A such that display assembly 202A substantially overlays keyboard assembly 204A, or vice versa) and an open position (e.g., a position of display assembly 202A relative to keyboard assembly 204A such that display assembly 202A does not substantially overlay keyboard assembly 204A, or vice versa, such as when the angle formed by display assembly 202A and keyboard assembly 204A at hinge 206A is substantially non zero). In some embodiments, information handling system 100 may be configured to allow for 360 degrees of rotation of display assembly 202A relative to keyboard assembly 204A (e.g., zero degrees in the closed position and 360 degrees in a "tablet" configuration).

Camera 120A may comprise any system, device, or apparatus configured to record images (moving or still) into one or more electrical signals that may be processed by a processor (e.g., processor 103 of FIG. 1). In some embodiments, camera 120A may implement camera 120 of information handling system 100.

As depicted in FIGS. 2-4, a camera 120A may be mechanically coupled to hinge 206A as shown. Accordingly, camera 120A may be interfaced to hinge 206A such that as display assembly 202A and keyboard assembly 204A are rotated relative to each other about hinge 206A, camera 120A may articulate with hinge 206A and may thus maintain an optimal position with respect to a user of information handling system 100A being within the visual frame of camera 120A when the user is viewing a display of display assembly 202A head on (e.g., camera 120A may be positioned such that it is facing a user in a direction normal to a surface of hinge 206A). Furthermore, as display assembly 202A is rotated towards 360 degrees relative to keyboard assembly 204A (e.g., the tablet configuration), camera 120A may continue to articulate so that it continues to be optimally aimed such that a user remains within the visual frame of camera 120A when viewing the display head on, even to the 360-degree rotation in the tablet configuration.

In some embodiments, camera 120A may be fixed relative to hinge 206A such that as display assembly 202A is rotated relative to keyboard assembly 204A, camera 120A is rotated the same angular distance (e.g., one degree for each degree of rotation of display assembly 202A relative to keyboard assembly 204A). In other embodiments, camera 120A may be mechanically coupled to hinge 206A via mechanical gears such that as display assembly 202A is rotated relative to keyboard assembly 204A, camera 120A is rotated in an amount which is a function of the rotation of display assembly 202A relative to keyboard assembly 204A, but not necessarily a one degree-to-one degree dependence.

As shown in FIGS. 2 and 4, keyboard assembly 204A may have a cavity 208A or other feature formed therein such that when information handling system 100A is in the closed position, cavity 208A accommodates the physical dimensions of camera 120A, thus allowing full closure of information handling system 100A.

Although information handling system 100A is shown in FIGS. 2-4 as having certain components (e.g., display assembly 202A, keyboard assembly 204A, hinge 206A, cavity 208A, and camera 120A), information handling system 100A may include any other suitable components which may not have been depicted in FIGS. 2-4 for the purposes of clarity and exposition.

Figure 5:
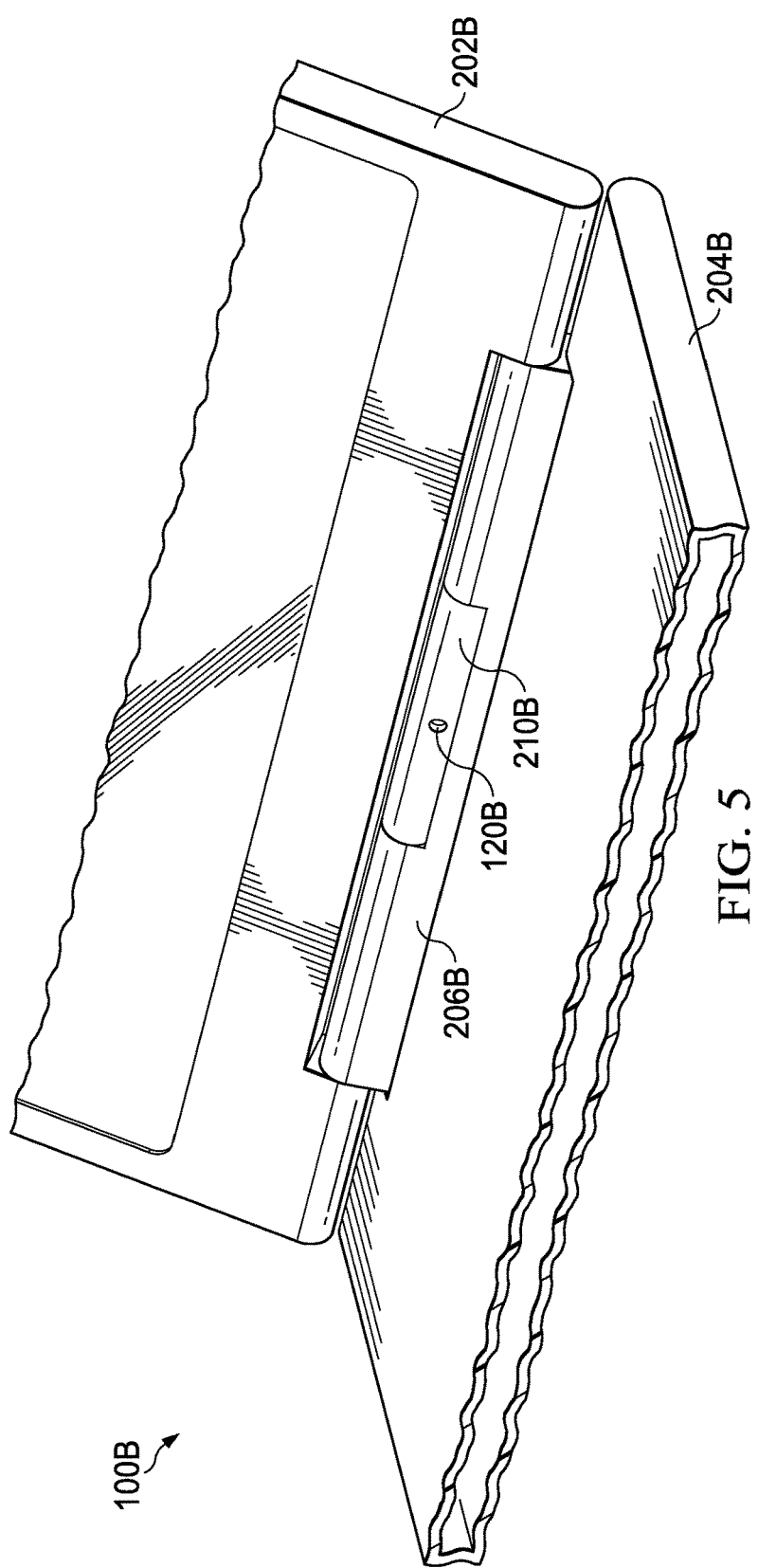
FIG. 5 illustrates an exterior perspective view of another example information handling system, in accordance with embodiments of the present disclosure.
Figure 6:
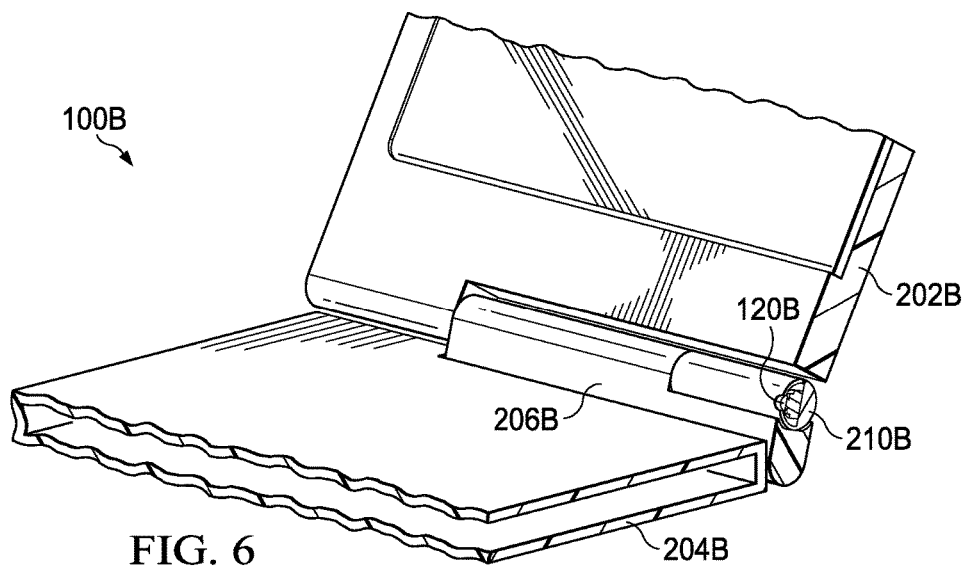
FIG. 6 illustrates an exterior cutaway perspective view of the example information handling system of FIG. 5, in accordance with embodiments of the present disclosure.
Figure 7:
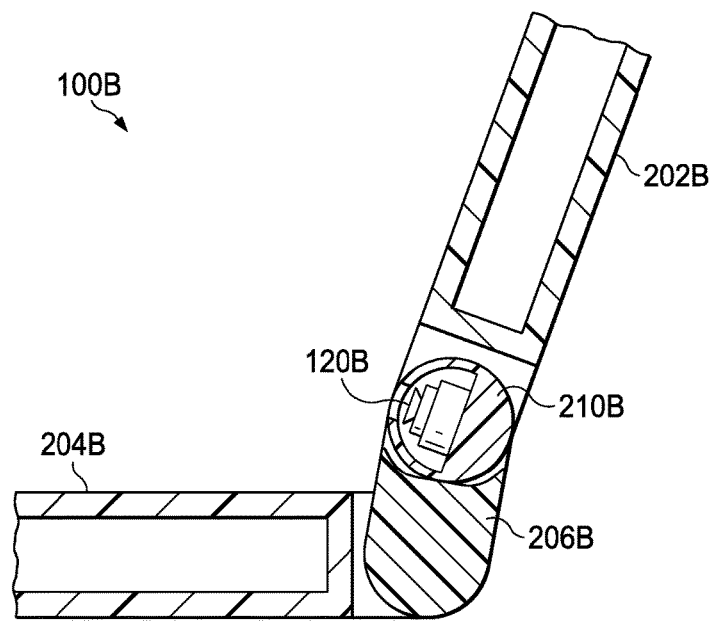
FIG. 7 illustrates a cross-sectional side view of the example information handling system of FIGS. 5 and 6, in accordance with embodiments of the present disclosure.

FIGS. 5-7 illustrate various views of example information handling system 100B, in accordance with embodiments of the present disclosure. FIG. 5 illustrates an exterior perspective view of example information handling system 100B, FIG. 6 illustrates an exterior cutaway perspective view of example information handling system 100B, and FIG. 7 illustrates a cross-sectional side view of example information handling system 100B.

In some embodiments, information handling system 100B may be used to implement information handling system 100 depicted in FIG. 1. Although FIGS. 5-7 depict information handling system 100B as a laptop or notebook computer, some of the methods and systems disclosed, described, and claimed herein may not be limited to application to a laptop or notebook, but may also be applied to any mobile device sized and shaped to be readily transported and carried on a person of a user of an information handling system, a desktop computer, a tower computer, a server, etc.

As depicted in FIGS. 5-7, information handling system 100B may include a display assembly 202B and a keyboard assembly 204B hingedly coupled to display assembly 202B via a hinge 206B. Each of display assembly 202B and keyboard assembly 204B may be integral parts of a chassis or case for information handling system 100B. Each of display assembly 202B and keyboard assembly 204B may have an enclosure made from one or more suitable materials, including without limitation plastic, steel, and/or aluminum.

In operation, information handling system 100B may be translated between a closed position (e.g., a position of display assembly 202B relative to keyboard assembly 204B such that display assembly 202B substantially overlays keyboard assembly 204B, or vice versa) and an open position (e.g., a position of display assembly 202B relative to keyboard assembly 204B such that display assembly 202B does not substantially overlay keyboard assembly 204B, or vice versa, such as when the angle formed by display assembly 202B and keyboard assembly 204B at hinge 206B is substantially non zero). In some embodiments, information handling system 100 may be configured to allow for 360 degrees of rotation of display assembly 202B relative to keyboard assembly 204B (e.g., zero degrees in the closed position and 360 degrees in a "tablet" configuration).

Camera 120B may comprise any system, device, or apparatus configured to record images (moving or still) into one or more electrical signals that may be processed by a processor (e.g., processor 103 of FIG. 1). In some embodiments, camera 120B may implement camera 120 of information handling system 100.

As depicted in FIGS. 5-7, camera 120B may be part of a camera assembly 210B that is rotatably coupled to hinge 206B (e.g., within a recess formed in hinge 206B) and which may be manually rotatable by a user with respect to hinge 206B. Accordingly, camera 120B may be interfaced to hinge 206B such that as display assembly 202B and keyboard assembly 204B are rotated relative to each other about hinge 206B, camera 120B may articulate with hinge 206B and may thus maintain an optimal position with respect to a user of information handling system 100B being within the visual frame of camera 120B when the user is viewing a display of display assembly 202B head on (e.g., camera 120B may be positioned such that it is facing a user in a direction normal to a surface of hinge 206B). Furthermore, as display assembly 202B is rotated towards 360 degrees relative to keyboard assembly 204B (e.g., the tablet configuration), camera 120B may continue to articulate so that it continues to be optimally aimed such that a user remains within the visual frame of camera 120B when viewing the display head on, even to the 360-degree rotation in the tablet configuration.

In addition, because camera assembly 210B may be rotatable relative to hinge 206B, a user may interact with camera assembly 210B to further rotate the position of camera 120B independent from the rotation of display assembly 202B relative to keyboard assembly 204B. For example, the rotatable coupling of camera assembly 210B to hinge 206B may allow a user to "fine tune" the rotational position of camera 120B provided by the translation of display assembly 202B relative to keyboard assembly 204B. Thus, in some embodiments, camera 120B may be mechanically coupled to hinge 206B via mechanical gears such that as display assembly 202B is rotated relative to keyboard assembly 204B, camera 120B is rotated in an amount which is a function of the rotation of display assembly 202B relative to keyboard assembly 204B to establish a coarse position of camera 120B, and then a user may further manually adjust the position of camera assembly 210B relative to hinge 206B to establish a fine position of camera 120B.

Although information handling system 100B is shown in FIGS. 5-7 as having certain components (e.g., display assembly 202B, keyboard assembly 204B, hinge 206B, cavity 208B, and camera 120B), information handling system 100B may include any other suitable components which may not have been depicted in FIGS. 5-7 for the purposes of clarity and exposition.

Figure 8B:
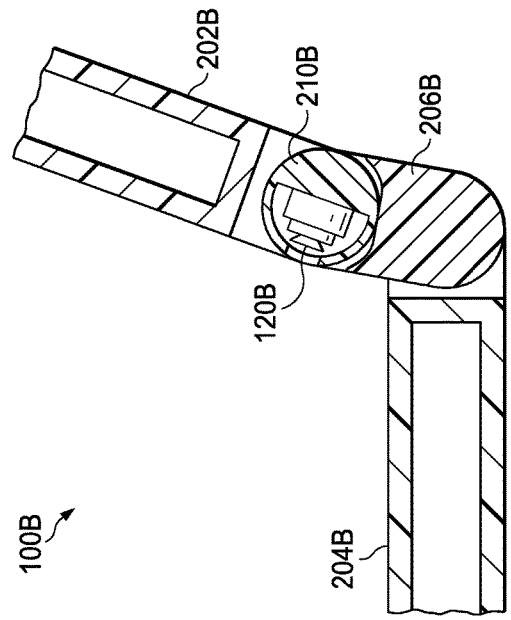
FIGS. 8A-8D illustrate a series of cross-sectional side views of the example information handling system of FIGS. 5-7 depicting a camera of the information handling system in various positions, in accordance with embodiments of the present disclosure.
Figure 8A:
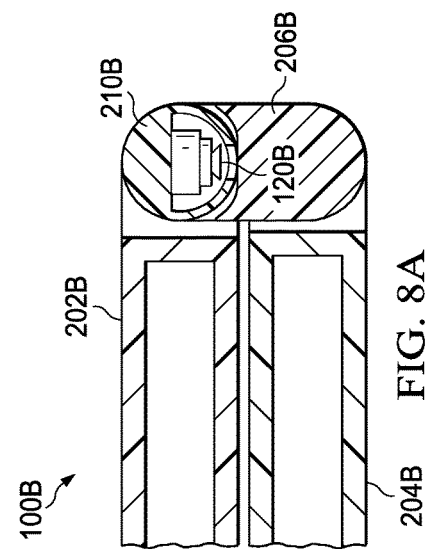
Figure 8D:
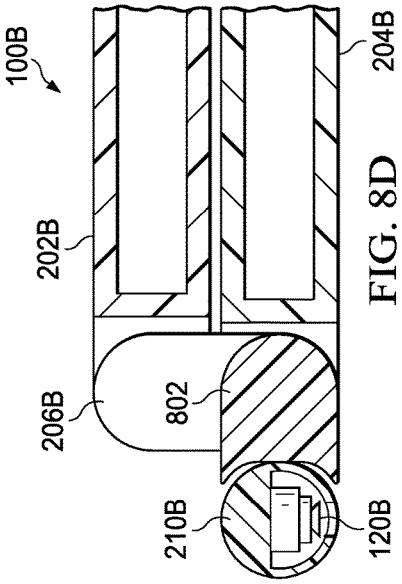
Figure 8C:
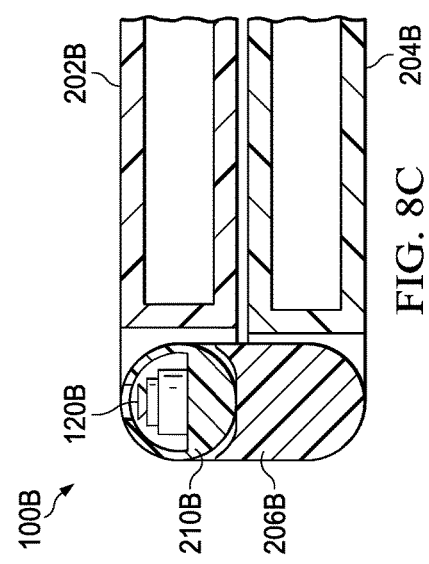
Figure 9:
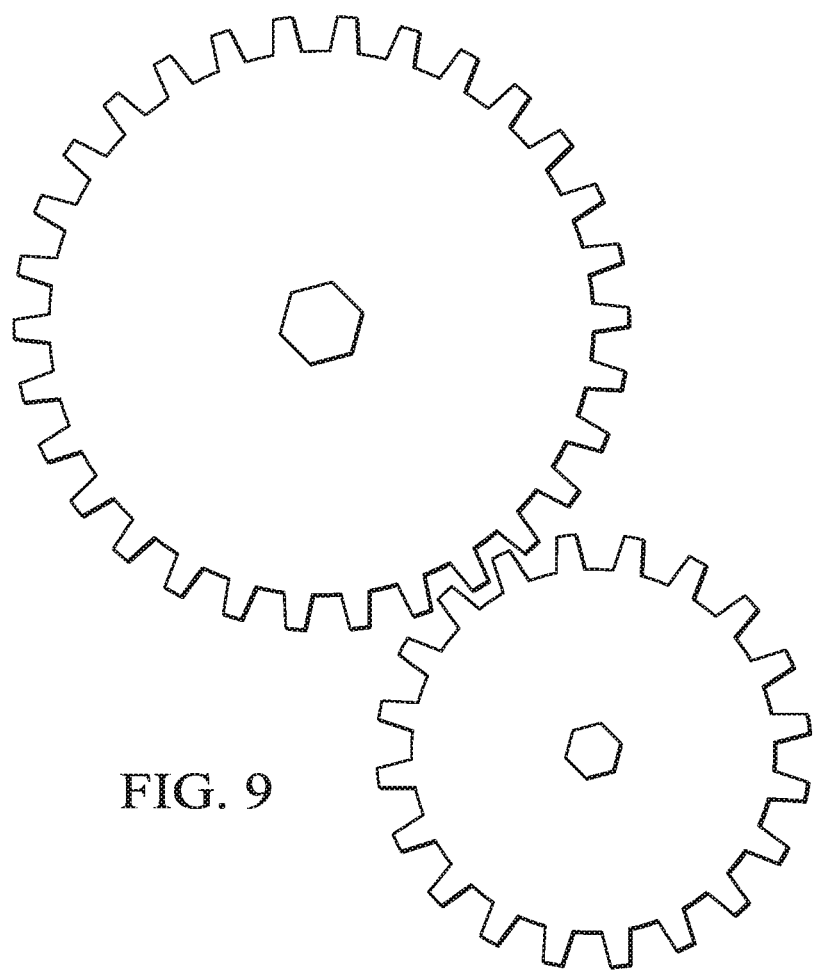
FIG. 9 illustrates a plurality of mechanical gears, in accordance with embodiments of the present disclosure.

FIGS. 8A-8D illustrate a series of cross-sectional side views of example information handling system 100B with camera 120B in various positions, in accordance with embodiments of the present disclosure. In FIG. 8A, information handling system 100B is shown in its closed position. In FIG. 8B, information handling system 100B is shown in an open position, wherein camera assembly 210B and camera 120B are shown rotated from their positions as shown in FIG. 8A such that the visual frame of camera 120B includes a user facing a display of display assembly 202B head on. In FIG. 8C, information handling system 100B is shown in a tablet configuration, wherein camera assembly 210B and camera 120B are shown rotated from their positions as shown in FIGS. 8A and 8B such that the visual frame of camera 120B includes a user facing a display of display assembly 202B head on. In FIG. 8D, information handling system 100B is shown in a tablet configuration, wherein hinge 206B is shown having a portion 802 split from the remainder of hinge 206B, allowing the visual frame of camera 120B to face in the opposite direction of a user facing a display of display assembly 202B head on.

The above figures and discussion are illustrative, but the present disclosure contemplates other embodiments wherein a camera is mechanically interfaced to a hinge of an information handling system such that the camera angle rotates as a display assembly rotates relative to a keyboard assembly. For example, in some embodiments, a camera may reside within a keyboard assembly and not a hinge, but may be mechanically coupled to the hinge (e.g., via one or more gears with a suitable gear ratio) such that the camera rotates up and out of the keyboard assembly as the hinge rotates, and such that when in tablet configuration, the camera's visual frame includes a user viewing a display of the display assembly head on.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a first member;
   a second member hingedly coupled to the first member via a hinge;
   a camera mechanically interfaced with the hinge such that as the first member is rotated relative to the second member about the hinge, the camera is operable to rotate as a function of the rotation of the first member relative to the second member; and
   a camera assembly that includes the camera mechanically coupled to the hinge within a recess formed by the hinge;
   wherein the hinge is configured to be split into two parts such that a portion of the hinge comprising the camera assembly is manually rotatable relative to a remainder of the hinge such that a visual frame of the camera is not obscured by the hinge when the first member is rotated 360 degrees relative to the second member.

2. The information handling system of claim 1, wherein the first member comprises a keyboard assembly.

3. The information handling system of claim 1, wherein at least one of the first member and the second member comprises a display assembly.

4. The information handling system of claim 1, wherein the camera assembly is mechanically coupled to the hinge such that the camera is manually rotatable relative to the hinge independently of rotation of the first member relative to the second member by way of a user manually interacting with the camera assembly.

5. The information handling system of claim 1, wherein:
   the camera is mechanically interfaced with the hinge such that the camera is configured to rotate as a function of the rotation of the first member relative to the second member for the approximately 360 degrees of rotation.

6. The information handling system of claim 1, wherein the first member comprises a cavity such that when the first member is in a closed position relative to the second member, the cavity accommodates physical dimensions of the camera.

7. The information handling system of claim 1, wherein the camera is mechanically coupled to the hinge via a plurality of mechanical gears.

8. The information handling system of claim 7, wherein the camera is mechanically coupled to the hinge such that the camera is manually rotatable relative to the hinge independently of rotation of the first member relative to the second member by way of a user manually interacting with the camera assembly, such that rotation of the camera under the influence of the mechanical gears establishes a coarse position of the camera, and user interaction with the camera establishes a fine position of the camera.

9. A method comprising:
   hingedly coupling a first member to a second member via a hinge;
   mechanically interfacing a camera with the hinge such that as the first member is rotated relative to the second member about the hinge, the camera rotates as a function of the rotation of the first member relative to the second member, wherein mechanically interfacing the camera with the hinge comprises mechanically coupling a camera assembly that includes the camera to the hinge within a recess formed in the hinge; and
   configuring the hinge such that a portion of the hinge comprising the camera assembly is manually rotatable relative to a remainder of the hinge such that a visual frame of the camera is not obscured by the hinge when the first member is rotated 360 degrees relative to the second member.

10. The method of claim 9, wherein the first member comprises a keyboard assembly.

11. The method of claim 9, wherein at least one of the first member and the second member comprises a display assembly.

12. The method of claim 9, wherein mechanically coupling the camera assembly to the hinge comprises coupling such that the camera is manually rotatable relative to the hinge independently of rotation of the first member relative to the second member by way of a user manually interacting with the camera assembly.

13. The method of claim 9, wherein:
   mechanically interfacing the camera with the hinge comprises interfacing such that the camera rotates as a function of the rotation of the first member relative to the second member for the approximately 360 degrees of rotation.

14. The method of claim 9, wherein the first member comprises a cavity such that when the first member is in a closed position relative to the second member, the cavity accommodates physical dimensions of the camera.

15. The method of claim 9, wherein mechanically interfacing the camera with the hinge comprises mechanically coupling the camera to the hinge via a plurality of mechanical gears.

16. The method of claim 15, wherein the camera is mechanically coupled to the hinge such that the camera is manually rotatable relative to the hinge independently of rotation of the first member relative to the second member by way of a user manually interacting with the camera assembly, such that rotation of the camera under the influence of the mechanical gears establishes a coarse position of the camera, and user interaction with the camera establishes a fine position of the camera.

* * * * *